(12) United States Patent
Bourke et al.

(10) Patent No.: US 9,081,757 B2
(45) Date of Patent: *Jul. 14, 2015

(54) SYSTEMS AND METHODS FOR TRACKING AND UPDATING HOSTED APPLICATIONS

(71) Applicant: SweetLabs, Inc., San Diego, CA (US)

(72) Inventors: Adrian Bourke, San Diego, CA (US);
Pawel Miskiewicz, Victoria (CA);
Benjamin P. Morris, Vancouver (CA);
Stefano Bertacchi, San Diego, CA (US);
Corey Gwin, San Diego, CA (US)

(73) Assignee: SWEETLABS, INC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/012,653

(22) Filed: Aug. 28, 2013

(65) Prior Publication Data

US 2014/0068421 A1    Mar. 6, 2014

Related U.S. Application Data

(63) Continuation-in-part of application No. 13/843,549, filed on Mar. 15, 2013, now Pat. No. 8,775,925.

(60) Provisional application No. 61/694,166, filed on Aug. 28, 2012.

(51) Int. Cl.
*G06F 17/00* (2006.01)
*G06F 17/22* (2006.01)
(Continued)

(52) U.S. Cl.
CPC .............. *G06F 17/2247* (2013.01); *G06F 8/38* (2013.01); *G06F 17/248* (2013.01); *G06F 17/3089* (2013.01)

(58) Field of Classification Search
CPC ..................................................... G06F 17/248
USPC .......... 715/234, 235, 236, 237, 240, 241, 242
See application file for complete search history.

(56) References Cited

U.S. PATENT DOCUMENTS 5,548,704 A * 8/1996 Steiner et al. ................. 715/807
5,916,310 A    6/1999 McCain
(Continued)

FOREIGN PATENT DOCUMENTS

CN    1322325 A    11/2001
WO    2006120280 A1   11/2006
(Continued)

OTHER PUBLICATIONS

International Search Report and Written Opinion for International Application No. PCT/US2012/65136, Search Completed Jan. 29, 2013, Mailed Feb. 8, 2013, 7 pgs.
(Continued)

*Primary Examiner* — Laurie Ries
(74) *Attorney, Agent, or Firm* — KPPB LLP

(57) ABSTRACT

Systems and methods for locally managing a user's interaction with content derived from web pages along with the tracking of the creation and update of the content in accordance with embodiments of the invention are illustrated. One embodiment of the invention includes a computing device configured to create a user hosted application including an application platform application stored in the storage of the computing device, where the application platform application includes a rendering engine process and an integration process, at least one hosted application including a background page file, wherein the virtual machine is configured to parse the instructions in the scripting language contained within the background page file, and to obtain at least one user hosted application, where a user hosted application and transmit a notification message based on obtaining the at least one user hosted application.

20 Claims, 7 Drawing Sheets

(51) Int. Cl.
    *G06F 17/24*     (2006.01)
    *G06F 9/44*     (2006.01)
    *G06F 17/30*     (2006.01)

(56) References Cited

U.S. PATENT DOCUMENTS

| | | | |
|---|---|---|---|
| 5,987,471 A * | 11/1999 | Bodine et al. | 1/1 |
| 6,023,698 A * | 2/2000 | Lavey et al. | 1/1 |
| 6,094,671 A | 7/2000 | Chase et al. | |
| 6,098,108 A * | 8/2000 | Sridhar et al. | 709/239 |
| 6,182,141 B1 * | 1/2001 | Blum et al. | 709/227 |
| 6,216,141 B1 | 4/2001 | Straub et al. | |
| 6,233,609 B1 * | 5/2001 | Mittal | 709/219 |
| 6,456,307 B1 | 9/2002 | Bates et al. | |
| 6,697,838 B1 | 2/2004 | Jakobson | |
| 6,718,516 B1 | 4/2004 | Claussen et al. | |
| 6,810,410 B1 | 10/2004 | Durham | |
| 6,909,992 B2 | 6/2005 | Ashley | |
| 7,207,000 B1 | 4/2007 | Shen et al. | |
| 7,272,786 B1 | 9/2007 | McCullough | |
| 7,401,325 B2 | 7/2008 | Backhouse et al. | |
| 7,614,018 B1 | 11/2009 | Ohazama et al. | |
| 7,636,683 B1 | 12/2009 | Mills et al. | |
| 7,681,134 B1 | 3/2010 | Grechishkin et al. | |
| 7,996,785 B2 | 8/2011 | Neil | |
| 8,046,672 B2 | 10/2011 | Hegde et al. | |
| 8,176,321 B1 | 5/2012 | Perry et al. | |
| 8,209,598 B1 | 6/2012 | Pandey | |
| 8,260,845 B1 | 9/2012 | Colton et al. | |
| 8,296,643 B1 | 10/2012 | Vasilik | |
| 8,296,684 B2 | 10/2012 | Duarte et al. | |
| 8,335,817 B1 | 12/2012 | Dayan | |
| 8,555,155 B2 | 10/2013 | Harrison et al. | |
| 8,566,697 B2 | 10/2013 | Meredith et al. | |
| 8,788,955 B2 * | 7/2014 | Quine | 715/763 |
| 2004/0081310 A1 | 4/2004 | Lueckhoff | |
| 2004/0221170 A1 | 11/2004 | Colvin et al. | |
| 2004/0268225 A1 | 12/2004 | Walsh et al. | |
| 2005/0005234 A1 | 1/2005 | Chen | |
| 2005/0102374 A1 | 5/2005 | Moragne et al. | |
| 2006/0005187 A1 | 1/2006 | Neil | |
| 2006/0059422 A1 | 3/2006 | Wu et al. | |
| 2006/0224989 A1 | 10/2006 | Pettiross et al. | |
| 2006/0265280 A1 | 11/2006 | Nakada et al. | |
| 2007/0050777 A1 | 3/2007 | Hutchinson et al. | |
| 2007/0244919 A1 * | 10/2007 | Wells et al. | 707/102 |
| 2007/0255814 A1 | 11/2007 | Green et al. | |
| 2007/0277109 A1 | 11/2007 | Chen et al. | |
| 2008/0021696 A1 | 1/2008 | Bartelt et al. | |
| 2008/0040226 A1 | 2/2008 | Roker | |
| 2008/0082565 A1 | 4/2008 | Chang et al. | |
| 2008/0108333 A1 | 5/2008 | Jemison et al. | |
| 2008/0140529 A1 | 6/2008 | Agarwal et al. | |
| 2008/0154718 A1 | 6/2008 | Flake et al. | |
| 2008/0172736 A1 | 7/2008 | Barr et al. | |
| 2008/0208589 A1 | 8/2008 | Cross et al. | |
| 2008/0256636 A1 | 10/2008 | Gassoway | |
| 2009/0019371 A1 | 1/2009 | Audet | |
| 2009/0037452 A1 * | 2/2009 | Baitalmal et al. | 707/101 |
| 2009/0037492 A1 * | 2/2009 | Baitalmal et al. | 707/201 |
| 2009/0070228 A1 | 3/2009 | Ronen | |
| 2009/0077174 A1 | 3/2009 | Janssen et al. | |
| 2009/0125833 A1 | 5/2009 | Abernethy, Jr. et al. | |
| 2009/0171993 A1 | 7/2009 | Arthursson | |
| 2009/0187928 A1 | 7/2009 | Mark | |
| 2009/0217179 A1 | 8/2009 | Mons et al. | |
| 2009/0249238 A1 | 10/2009 | Chudy et al. | |
| 2009/0271394 A1 | 10/2009 | Allen et al. | |
| 2009/0282333 A1 | 11/2009 | Olsen et al. | |
| 2010/0054128 A1 | 3/2010 | O'Hern | |
| 2010/0114887 A1 | 5/2010 | Conway et al. | |
| 2010/0146529 A1 | 6/2010 | Heath et al. | |
| 2010/0211906 A1 | 8/2010 | Kanai | |
| 2010/0228594 A1 | 9/2010 | Chweh et al. | |
| 2010/0233996 A1 * | 9/2010 | Herz et al. | 455/411 |
| 2010/0318608 A1 * | 12/2010 | Huang et al. | 709/205 |
| 2011/0016169 A1 | 1/2011 | Cahill et al. | |
| 2011/0055005 A1 | 3/2011 | Lang | |
| 2011/0093900 A1 | 4/2011 | Patel et al. | |
| 2011/0138295 A1 | 6/2011 | Momchilov et al. | |
| 2011/0138314 A1 | 6/2011 | Mir et al. | |
| 2011/0282700 A1 * | 11/2011 | Cockcroft | 705/5 |
| 2011/0289422 A1 | 11/2011 | Spivack et al. | |
| 2011/0302524 A1 * | 12/2011 | Forstall | 715/781 |
| 2011/0307738 A1 | 12/2011 | Hilerio et al. | |
| 2011/0307880 A1 | 12/2011 | Hilerio et al. | |
| 2011/0307883 A1 | 12/2011 | Hilerio et al. | |
| 2011/0307946 A1 | 12/2011 | Hilerio et al. | |
| 2012/0030617 A1 | 2/2012 | Louch | |
| 2012/0047442 A1 | 2/2012 | Nicolaou et al. | |
| 2012/0066583 A1 | 3/2012 | Priestley et al. | |
| 2012/0066634 A1 | 3/2012 | Kim et al. | |
| 2012/0084292 A1 * | 4/2012 | Liang et al. | 707/741 |
| 2012/0084713 A1 | 4/2012 | Desai et al. | |
| 2012/0096396 A1 | 4/2012 | Ording et al. | |
| 2012/0150963 A1 | 6/2012 | Horowitz et al. | |
| 2012/0151368 A1 | 6/2012 | Tam | |
| 2012/0166956 A1 | 6/2012 | Hilerio et al. | |
| 2012/0166959 A1 | 6/2012 | Hilerio et al. | |
| 2012/0173312 A1 | 7/2012 | Kern | |
| 2012/0174075 A1 | 7/2012 | Carteri et al. | |
| 2012/0235912 A1 | 9/2012 | Laubach | |
| 2012/0290919 A1 | 11/2012 | Melnyk et al. | |
| 2012/0296959 A1 | 11/2012 | Momchilov et al. | |
| 2012/0297291 A1 | 11/2012 | Fainberg et al. | |
| 2012/0297377 A1 | 11/2012 | Chen et al. | |
| 2012/0324338 A1 | 12/2012 | Meredith et al. | |
| 2013/0024763 A1 | 1/2013 | Nemati et al. | |
| 2013/0073401 A1 | 3/2013 | Cook | |
| 2013/0124211 A1 | 5/2013 | McDonough | |
| 2013/0124557 A1 | 5/2013 | Goode et al. | |
| 2013/0173319 A1 | 7/2013 | Thomas et al. | |
| 2013/0204975 A1 * | 8/2013 | Keith, Jr. | 709/219 |
| 2013/0246906 A1 | 9/2013 | Hamon | |
| 2013/0304581 A1 | 11/2013 | Soroca et al. | |
| 2014/0325344 A1 * | 10/2014 | Bourke et al. | 715/235 |

FOREIGN PATENT DOCUMENTS

| | | |
|---|---|---|
| WO | 2011160139 A1 | 12/2011 |
| WO | 2013074713 A1 | 5/2013 |

OTHER PUBLICATIONS

International Search Report and Written Opinion for International Application No. PCT/US2009/36069, date completed Jun. 23, 2009, 8 pgs.

International Search Report and Written Opinion for International Application PCT/US2011/041129, Report completed Sep. 22, 2011; 15 pgs.

Laufer, "A Hike through Post-EJB J2EE Web Application Architecture", IEEE, 2005, pp. 80-88.

Lee et al., "Integrating Service Composition Flow with User Interactions", IEEE, 2008, pp. 103-108.

Mikkonen et al., "Towards a Uniform Web Application Platform for Desktop Computers and Mobile Devices", ACM, 2008, pp. 1-29.

Stearn, "XULRunner: A New Approach for Developing Rich Internet Applications", IEEE, 2007, pp. 67-73.

Sugawara et al., "A Novel Intuitive GUI Method for User-friendly Operation", Google 2009, pp. 235-246.

Pokki, Download Free Desktop Apps and games. available at http://web.archive.org/web/20150105201753/https://www.pokki.com/, Jan. 15, 2013.

* cited by examiner

SYSTEMS AND METHODS FOR TRACKING AND UPDATING HOSTED APPLICATIONS

CROSS REFERENCE TO RELATED APPLICATIONS

The present application is a continuation-in-part of U.S. patent application Ser. No. 13/843,549 filed Mar. 15, 2013, which claims priority to U.S. Provisional Patent Application Ser. No. 61/694,166, filed Aug. 28, 2012. The disclosures of U.S. patent application Ser. No. 13/843,549 and U.S. Provisional Patent Application Ser. No. 61/694,166 are incorporated by reference herein in their entirety.

FIELD OF THE INVENTION

The present invention is generally related to applications and more specifically to applications that manage a user's interaction with web pages.

BACKGROUND

A runtime environment can enable an application to be integrated into the computing environment of a computing device. Typically, a runtime environment is provided for applications to be implemented natively (i.e. compiled into the machine code of the computing device on which it resides). However, other runtime environments can be provided for applications to be implemented non-natively on a computing device, such as web applications that can operate within a virtual machine provided by a web browser that operates natively on a computing device.

A web browser is an application that typically retrieves and presents information found on web pages maintained by content servers over a network. A web page is typically a file formatted in browser supported formats such as but not limited to markup languages (such as but not limited to HTML), scripts (such as but not limited to JavaScript) and style sheets (such as but not limited to CSS) that can be displayed by a web browser.

SUMMARY OF THE INVENTION

Systems and methods for locally managing a user's interaction with content derived from web pages along with the tracking of the creation and update of the content in accordance with embodiments of the invention are illustrated. One embodiment of the invention includes a computing device configured to create a user hosted application including a processor and storage, where an operating system is installed on the computing device that configures the processor to create a computing environment, an application platform application stored in the storage of the computing device, where the application platform application includes a rendering engine process configured to render pages within the computing environment created by the operating system by interpreting instructions written in a rendering language and implement a virtual machine configured to execute instructions written in a scripting language and an integration process that enables instructions executing within the virtual machine to modify the computing environment, at least one hosted application including a background page file including instructions in the scripting language, wherein the virtual machine is configured to parse the instructions in the scripting language contained within the background page file to configure the processor to download at least one remotely hosted file containing instructions in the rendering language for rendering a web page, modify the instructions written in the scripting language within the at least one downloaded file in accordance with a predetermined page modification rule to create at least one modified file, and build a document object model (DOM) based on at least the instructions in the at least one modified file, wherein the rendering engine process is configured to render a user interface page based on the DOM generated by the execution of the background page, wherein the application platform application configures the processor to obtain at least one user hosted application, where a user hosted application includes a background page and at least one reference to a web page, and wherein the application platform application configures the processor to transmit a notification message based on obtaining the at least one user hosted application.

In another embodiment of the invention, the notification message includes the at least one reference to the web page.

In an additional embodiment of the invention, the notification message includes unique identifier data, where the unique identifier data is generated based at least a portion of the user hosted application.

In yet another additional embodiment of the invention, the application platform application configures the processor to obtain a hosted application update and apply the hosted application update to at least one of the at least one user hosted applications.

In still another additional embodiment of the invention, at least one user hosted application in the at least one hosted application further includes version metadata identifying the version of the hosted application and applying the hosted application update to the user hosted application includes modifying the version metadata associated with the user hosted application, where the modified version metadata indicates that the hosted application update has been applied to the user hosted application.

In yet still another additional embodiment of the invention, the hosted application update further includes hosted application update version metadata identifying at least one version of the user hosted application to which the hosted application update applies and the application platform application configures the processor to apply the hosted application update to the user hosted application when the version metadata is identified in the hosted application update version metadata.

In yet another embodiment of the invention, at least one user hosted application in the at least one hosted application further includes version metadata identifying the version of the user hosted application and applying the hosted application update to a hosted application includes obtaining a supported hosted application corresponding to the user hosted application based on the version metadata.

In yet still another embodiment of the invention, the application platform application further configures the processor to apply the hosted application update to the user hosted application by obtaining a supported hosted application based on the user hosted application.

In yet another additional embodiment of the invention, the hosted application update is applied to the obtained supported hosted application.

In still another additional embodiment of the invention, the application platform application further configures the processor to display a notification indicating that a supported hosted application corresponding to the user hosted application is available.

Yet another embodiment of the invention includes a method for creating user hosted applications, including obtaining at least one user hosted application using a computing device, where a user hosted application includes a background page including instructions in a scripting language and at least one reference to a web page and the user hosted application is configured to be executed by an application platform application on the computing device, where the application platform application includes a rendering engine process configured to render pages within the computing environment created by an operating system on the computing device by interpreting instructions written in a rendering language, and implement a virtual machine configured to execute instructions written in the scripting language and parse the instructions in the scripting language contained within the background page file to download at least one remotely hosted file containing instructions in the rendering language for rendering a web page, modify the instructions written in the scripting language within the at least one downloaded file in accordance with a predetermined page modification rule to create at least one modified file, and build a document object model (DOM) based on at least the instructions in the at least one modified file, and transmitting a notification message based on obtaining the at least one user hosted application using the computing device.

Still another embodiment of the invention includes a hosted application server system, including a processor and storage connected to the processor and configured to store an application hosting application, wherein the application hosting application configures the processor to obtain a set of supported hosted applications, where a supported hosted application includes a background page including instructions in a scripting language and a hosted application is configured to be executed by an application platform application on a computing device separate from the hosted application server system, where the application platform application includes a rendering engine process configured to render pages within the computing environment created by an operating system on the computing device by interpreting instructions written in a rendering language and implement a virtual machine configured to execute instructions written in the scripting language and parse the instructions in the scripting language contained within the background page file to download at least one remotely hosted file containing instructions in the rendering language for rendering a web page, modify the instructions written in the scripting language within the at least one downloaded file in accordance with a predetermined page modification rule to create at least one modified file, and build a document object model (DOM) based on at least the instructions in the at least one modified file, and obtain a set of notification messages, where a notification message in the set of notification messages includes a notification message sender identifying the source of the notification message and the notification message includes a description of a user hosted application, where the description includes at least one reference to a web page referenced by the user hosted application, and wherein the user hosted application includes a background page file including instructions in the scripting language.

In yet another additional embodiment of the invention, the application hosting application further configures the processor to identify at least one supported hosted application in the set of supported applications corresponding to a user hosted application identified in at least one notification message in the set of notification messages.

In still another additional embodiment of the invention, the supported hosted application is identified using the at least one web page referenced in the user hosted application.

In yet still another additional embodiment of the invention, the supported hosted application is identified using unique identifier data based at least a portion of the user hosted application.

In yet another embodiment of the invention, the application hosting application further configures the processor to transmit a supported application message to the source of the notification message when a supported hosted application is identified based on the user hosted application and the supported application message describes the supported hosted application corresponding to the user hosted application.

In still another embodiment of the invention, the application hosting application further configures the processor to obtain a hosted application update and the hosted application update corresponds to at least one supported hosted application in the set of supported hosted applications.

In yet still another embodiment of the invention, the application hosting application further configures the processor to transmit the hosted application update to at least one notification message sender identified by a notification message in the set of notification messages and the user hosted application identified in the notification message corresponds to the supported hosted application corresponding to the hosted application update.

In yet another additional embodiment of the invention, the application hosting application further configures the processor to transmit the supported hosted application corresponding to the hosted application update to at least one notification message sender identified by a notification message in the set of notification messages and the user hosted application identified in the notification message corresponds to the supported hosted application corresponding to the hosted application update.

In still another additional embodiment of the invention, the application hosting application further configures the processor to identify at least one user hosted application described in the set of notifications without a corresponding supported hosted application and transmit an application developer notification based on the identified user hosted applications, where the application developer notification describes the web pages referenced by the user hosted applications.

DETAILED DESCRIPTION

Figure 1:
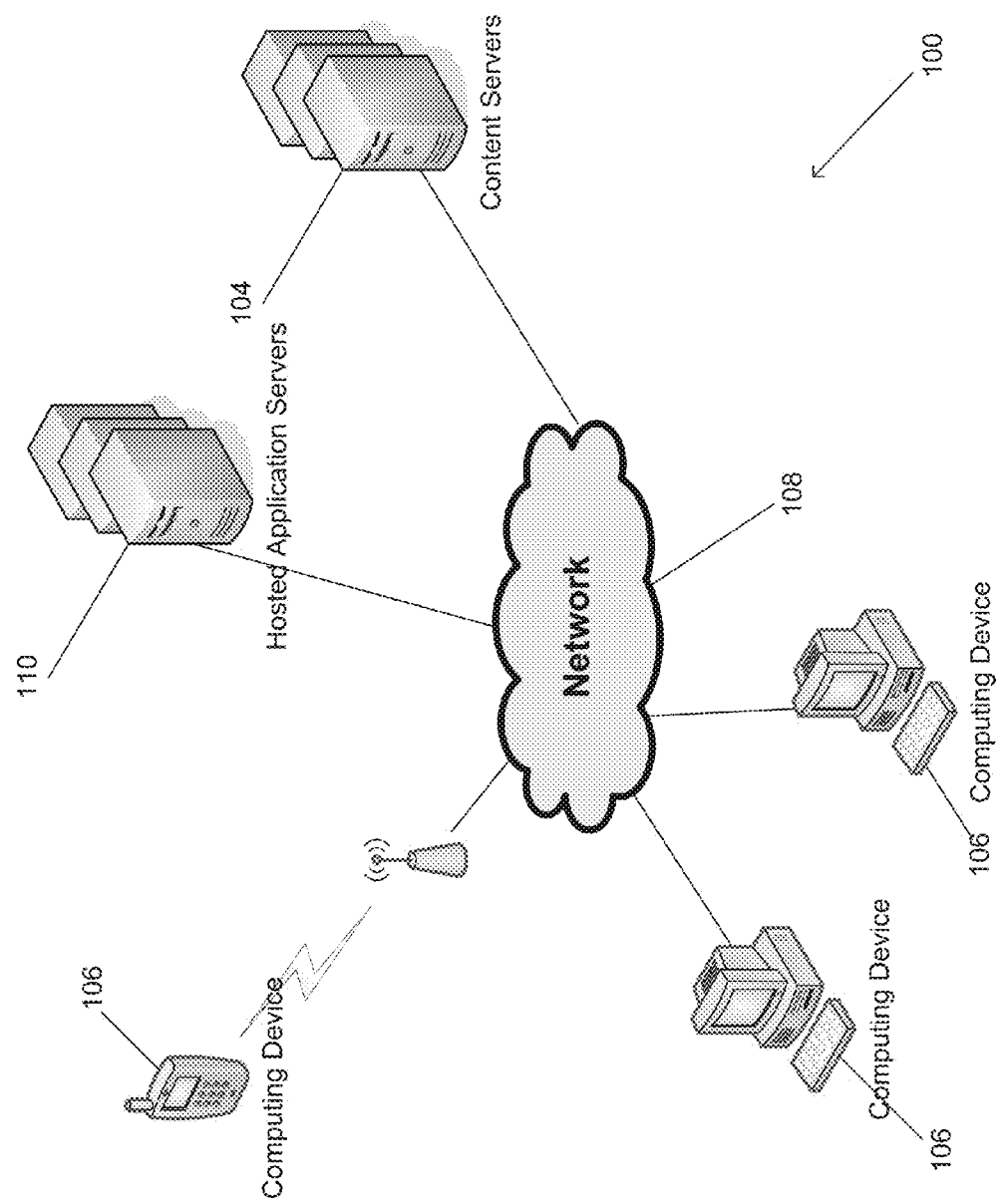
FIG. 1 is a network diagram illustrating a system that utilizes hosted applications in accordance with an embodiment of the invention.

Turning now to the drawings, systems and methods for locally managing a user's interaction with content derived from web pages within the user interface of a hosted application executing within a runtime provided by an application platform on a computing device along with the tracking of the creation and update of the hosted applications in accordance with embodiments of the invention are illustrated. In many embodiments, a runtime provided by an application platform enables the execution of a non-natively implemented hosted application. Application platforms that create a runtime environment in which non-natively implemented hosted applications can execute are discussed in U.S. patent application Ser. No. 13/164,740, filed Jun. 20, 2011 and titled "Systems and Methods for Integration of an Application Runtime Environment into a User Computing Environment," the disclosure of which is hereby incorporated by reference in its entirety. In several embodiments, a runtime environment generated by an application platform is at least partially natively implemented and provides an intuitive user interface that is integrated with the computing environment of a device's operating system. The application platform can enable a user to access, organize, and discover applications, including hosted applications, which can execute within the runtime environment. In many embodiments, an application platform includes a rendering engine layer and an integration layer. The rendering engine layer includes various parsers and virtual machines associated with supporting specific web technologies including but not limited to HTML, JavaScript, and CSS. The integration layer exposes a number of Application Programming Interfaces (APIs) that can be called by a hosted application to make modifications to a user's computing environment. In several embodiments, the integration layer APIs are JavaScript APIs that can be called by a hosted application running within the application runtime environment created by the application platform. In response to the API calls, the integration layer can communicate with the operating system and/or natively implemented processes to modify the user's computing environment.

A hosted application can be implemented using a background page that generates at least one user interface page. User interface pages are generated locally using the logic of the background page, found within the hosted application's package stored on a computing device, and derived from a web page maintained by content servers over a network such as (but not limited to) the Internet. The background page is loaded locally at the time the hosted application is initiated from the hosted application's package and is defined in the hosted application manifest. A hosted application's package can include an application manifest, located in the root directory of the hosted application's package, to bootstrap the application into an application platform (such as but not limited to an application platform application) in order to share the resources of the application platform.

In many embodiments, the background page contains all of the logic of the hosted application. The logic of the hosted application can parse one or more remotely hosted text files that constitute a web page to determine the content of the text file(s). From a determination of the content of the text file(s), the logic of the background page can generate a user interface page derived from the remotely hosted web page by including or excluding content, markup, scripts, or style sheets in view of the remotely hosted web page. For example, the logic could cause exclusion of certain, text, pictures, sounds or animation, cause a change in the layout of content, preventing the loading of a pop up window, and/or changing the text font. In many embodiments, any of a variety of predetermined page modification rule can be applied that is capable of being expressed as a logical statement. In a number of embodiments, the logic can vary the layout of the content based on the computing device on which the hosted application is being executed. The logic can include or exclude content, markup, scripts or style sheets upon first accessing the web page as one or more text files maintained on a remote server (by modifying the instructions in markup and/or scripting language(s) contained within the text file(s)) and once again after building a Document Object Model (DOM) using the text files (by modifying the nodes or the text of the DOM). Furthermore, the inclusion of content, markup, scripts, or style sheets also includes the inclusion of application platform APIs, which can call for functions performed locally at the application platform or performed remotely at a remote server. The logic within the background page can also be used to generate notifications (such as pop-up notifications) that provide information to the user outside of the normal flow of the user interface pages. The background page can be implemented using one or more text files (as opposed to a binary executable file) that can include HTML, JavaScript and/or CSSs that the rendering engine layer of the application platform parses to implement the logic contained therein in a similar fashion to the way in which the rendering engine of a web browser application parses a conventional web page when enabling a web application on a computing device. In numerous embodiments, a background page can load JavaScript as the logic that conducts page flow control and injection of styling and functionality to the content and markup, CSS and JavaScript derived from a web page to generate a user interface page. In certain embodiments, a background page is formatted in a markup language, such as HTML, located within the hosted application's package. The JavaScript of the background page can be loaded locally or from a remote server and dynamically pulled as the application is launched.

An application platform can implement a user interface for a hosted application using instructions contained within a background page to generate user interface pages with content derived from web pages hosted on remote servers. In certain embodiments, a user interface page is generated according to the logic of the background page using a URL that enables retrieval of a web page from a remote server that can be rendered by the rendering engine of the application platform to create the user interface page based upon the content found using the URL. In numerous embodiments, a user interface page is generated by adding to and/or removing portions of the content along with the markup, scripts, and CSS retrieved from a web page before or as the user interface page is displayed. Certain user interface pages may not, however, require any modification in order to be rendered by the application platform. In certain embodiments, a user interface page is rendered by the application platform in response to a user selecting a link, such as a hyperlink or Uniform Resource Locator (URL). In response to the selection of a link, the hosted application can instruct the application platform to generate a user interface page using the web page identified by the link. In several embodiments, a user can interact with content derived from web pages as a controlled flow of user interface pages in an experience akin to how a user would experience content on a mobile application executing natively within an operating system such as (but not limited to) the iOS mobile operating system developed and distributed by Apple Inc. headquartered in Cupertino, Calif. or the Android mobile operating system released by Google, Inc. headquartered in Mountain View, Calif. Thereby, a hosted application manages user interaction with remotely hosted web pages by generating user interface pages from the remotely hosted web pages according to instructions contained within a background page and/or obtained using the background page that control the flow from one user interface page to another.

Hosted applications can be officially supported by a hosted application developer (e.g. a supported hosted application) and/or created from one or more remotely hosted web pages by a user of a computing device on which an application platform (e.g. a user hosted application) is installed. User hosted applications can be created by creating a background page containing the logic of the user hosted application. In a variety of embodiments, the logic of the user hosted application includes page flow control logic for one or more remote web pages referenced (such as by a URL) within the user hosted application. In this way, the user hosted application can provide the user interface flow of the remote web pages (as derived from the remote web pages hosted on the content server) as a native application within the computing environment of a computing device. The user hosted applications can be created using a hosted application server system and/or a computing device as appropriate to the requirements of a specific application in accordance with embodiments of the invention.

Systems, including hosted application server systems, and methods that can be utilized to host, recommend, and distribute supported hosted applications in accordance with embodiments of the invention are described in U.S. patent application Ser. No. 13/677,298, titled "Systems and Methods for User Configurable Recommendation Systems" and filed Nov. 14, 2012, the entirety of which is hereby incorporated by reference. Hosted application server systems host and/or provide references to supported hosted applications and track user hosted applications based on received notification messages identifying a user hosted application. In several embodiments, hosted application server systems provide an online marketplace for the storage, promotion, sale, and/or maintenance of supported hosted applications. Hosted application server systems also receive supported hosted applications (and/or updates to supported hosted applications) and can push updates to supported hosted applications stored on user computing devices. Additionally, user hosted applications can be published within the online marketplace and made available for download on a variety of computing devices.

In many embodiments, when a user hosted application is created, a notification is sent to a hosted application server system identifying the website and/or web pages associated with the user hosted application. The website associated with a particular user hosted application can be identified using a URL associated with the background page of the user hosted application, remote web pages utilized by the user hosted application to create user interface pages, and/or by any other reference within the user hosted application to a unique identifier determined based on the website and/or remotely hosted web pages. In this way, hosted application server systems in accordance with many embodiments of the invention can be configured to track the creation of user hosted applications. In several embodiments, hosted application server systems are also configured to identify existing supported hosted applications that correspond to the user hosted applications. The hosted application server system can notify a user that a supported hosted application (update) is available for their user hosted application and/or automatically push the supported hosted application (update) to the user's device. Additionally, hosted application server systems can identify user hosted applications that do not have a corresponding supported hosted application and recommend to the developers/operators of a particular website that users are creating user hosted applications for their website. In this way, hosted application server systems can notify hosted application developers of a potential market for a supported hosted application referencing their website and/or web pages based on the tracked user hosted applications.

Although specific embodiments of hosted applications and hosted application server systems in accordance with embodiments of the invention are discussed above, hosted applications can be implemented in any manner as appropriate to the requirements of a specific application in accordance with embodiments of the invention. Systems and methods incorporating application platforms configured to execute hosted applications that generate user interface pages from remotely hosted web pages in accordance with embodiments of the invention are discussed below.

System Architecture

Hosted applications running on computing devices in accordance with many embodiments of the invention can manage user interactions derived from a remote web page formatted in a cross-platform language (e.g. a markup and/or scripting language supported by a web browser application) into a format suitable for display as a user interface page. In certain embodiments, the computing devices on which hosted applications execute within a runtime provided by an application platform can communicate via a network with content servers that maintain text files and content utilized by rendering engines in web browser applications to render web pages. In many embodiments, the text files contain instructions in markup languages, and/or scripting languages that a web browser application interprets when formatting content for display. As the hosted application executes within the application platform, the hosted application derives user interface pages from the text files and content retrieved from the remote content servers. The user interface pages can then be rendered by a rendering engine within the application platform to provide a user interface for the hosted application.

A network diagram illustrating a system that utilizes hosted applications in accordance with an embodiment of the invention is illustrated in FIG. 1. The system 100 includes a number of computing devices 106 connected to content servers 104 via a network 108, such as but not limited to the Internet. The content servers 104 maintain websites, including web pages and content that can be accessed by hosted applications running on computing devices 106. Within each computing device, hosted applications can execute within the runtime environment provided by an application platform and can access web pages from one or more content servers to generate user interface pages.

The computing devices 106 are also connected to the hosted application servers 110 via the network 108. The computing devices 106 can be configured to allow for the creation of user hosted applications based on remote web pages and/or websites provided by the content servers 104. The user hosted applications can create user hosted applications using a variety of techniques as appropriate to the requirements of a specific application in accordance with embodiments of the invention, such as by using a hosted application, a web browser application (or a plug-in/extension within the web browser application), and/or a native application running on the computing devices 106. In several embodiments, the hosted application servers 110 and/or content servers 104 provide an API allowing for the creation of user hosted applications for one or more remote web pages. The hosted application servers 110 track the creation of user hosted applications by the computing devices 106, the content servers 104, and/or the hosted application servers 110. In a variety of embodiments, this tracking is performed using notification messages provided by the computing devices 106 and/or the content servers 104.

The hosted application servers 110 maintain a database of user hosted applications that are being tracked so that updates and/or supported hosted applications can be provided to the computing devices 106. The hosted application servers 110 obtain a supported hosted application and/or a reference to a supported hosted application related to the website(s) provided by the content servers 104 and identify user hosted applications running on one or more computing devices 106 that are associated with those website(s). In many embodiments, updates to supported hosted applications are also stored and/or referenced by the hosted application servers 110. The hosted application servers 110 are further configured to provide the supported hosted applications and/or hosted application updates (and/or a notification) to the computing devices 106 having the corresponding user hosted application. In several embodiments, the hosted application servers 110 are configured to provide an online marketplace where computing devices 106 can browse and download supported hosted applications. This online marketplace can also provide an indication that a user hosted application installed on a computing device 106 has a corresponding supported hosted application available via the online marketplace as appropriate to the requirements of a specific application in accordance with embodiments of the invention.

Although specific systems that utilize hosted applications are discussed above, systems can utilize hosted applications in any manner as appropriate to the requirements of a specific application in accordance with embodiments of the invention. The lifecycle of hosted applications in accordance with embodiments of the invention are discussed further below.

Hosted Application Lifecycle

Hosted applications in accordance with many embodiments of the invention locally manage a user's interactions by locally creating a user interface page derived from remote web pages. Hosted applications are configured to generate a user interface page according to instructions in a scripting language, such as (but not limited to) JavaScript, contained within a background page and/or obtained using the background page. The instructions within the background page dictates the injection or removal of content (such as but not limited to pictures, animation, sound or text), and the HTML, JavaScript and/or CSSs found within the text files maintained on a remote server to generate a user interface page. The background page is loaded upon hosted application initialization and remains active in the background so long as the hosted application is executing. The background page includes the logic used to generate user interface pages from web pages retrieved from a remote server that maintains the web pages. Executing the instructions generates instructions from which the rendering engine layer of the application platform can render the user interface page on a computing device and the integration layer of the application platform can integrate the user interface page with the functionality of the computing device.

Thereby, a user interface page derived from a web page can present a user of the computing device with a controlled user experience, according to the logic of the background page executing from a hosted application's package locally stored on the computing device. For example, a hosted application can control the content with which a user can interact, such as by allowing or denying a user's access to content found on a particular web page (such as pop-up windows or particular images found on the web page).

Figure 2:
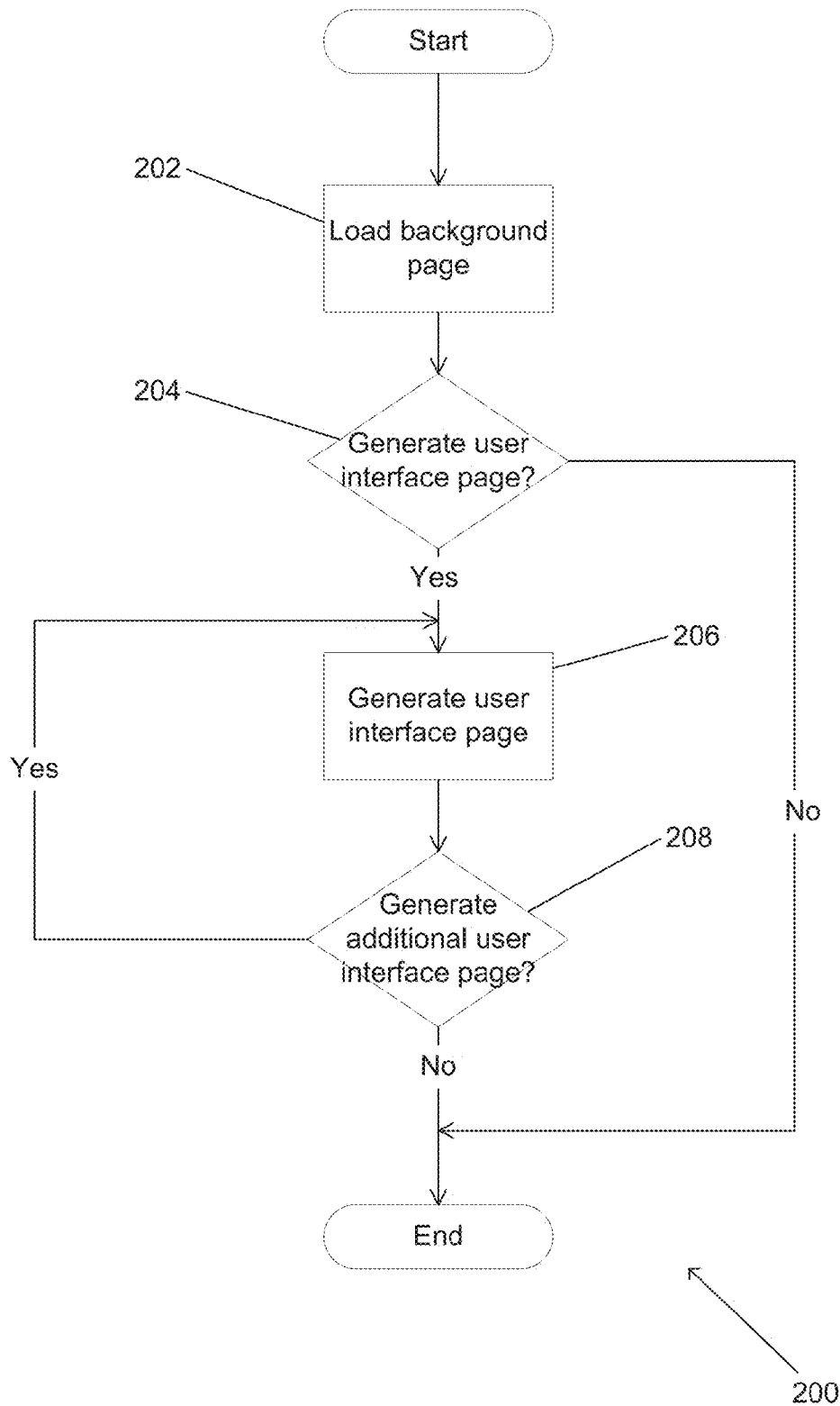
FIG. 2 is a flowchart of a lifecycle process of a hosted application in accordance with an embodiment of the invention.

In several embodiments, a hosted application's lifecycle includes the generation of various user interface pages according to the instructions contained within the background page and/or obtained using the background page. A lifecycle process of a hosted application in accordance with an embodiment of the invention is illustrated in FIG. 2. The process 200 includes loading (202) a background page. In certain embodiments, a background page is loaded upon initializing the hosted application. A background page can be loaded from a hosted application's package locally stored on a computing device. In several embodiments, the background page includes a URL that is used to load one or more text files from a remote server that include instructions implementing the logic of the hosted application. Instructions contained within a background page and/or instructions contained within files retrieved using information contained within the background page can be collectively referred to as the instructions of the background page and are part of the logic of the background page. The logic of the hosted application is used to generate user interface pages from web pages maintained by remote servers. After the background page is loaded (202), a decision (204) is made as to whether a user interface page should be generated. The decision is made according to the instructions of the background page. In certain embodiments, the instructions of the background page automatically load an initial user interface page using a URL that directs the hosted application to access one or more files on a remote website that can be rendered as a web page using a web browser application. The application platform utilizes the one or more files indicated by the URL to generate a user interface page. The URL can be loaded automatically (such as but not limited to where the logic of the background page retrieves a URL from the hosted application's package without explicit user instructions) or manually (such as but not limited to where a user provides a specific URL for the background page of the hosted application). The process continues generating (206) user interface pages as a user interacts with the hosted application until there is no further need to generate user interface pages (e.g. the user hides, closes or terminates the execution of the hosted application). The decision as to whether additional user interface pages are to be generated is made by the logic of the background page.

Although specific lifecycles of hosted applications are discussed above, a hosted application can have any lifecycle as appropriate to the requirements of a specific application in accordance with embodiments of the invention. Techniques for the generation of a user interface page as appropriate to the requirements of specific applications in accordance with embodiments of the invention are discussed in more detail below.

Generation of User Interface Pages

User interface pages in accordance with embodiments of the invention can be generated from content and one or more text files containing instructions in markup and/or scripting languages capable of being rendered by a web browser application. The user interface pages are generated from the content and one or more text files according to the instructions of a background page that specifies the logic of a hosted application. A user interface page is generated by modifying the text that represents a web page by injecting and/or removing content, markup, style sheets and scripts from the retrieved web page according to the logic of the background page. Although in many embodiments a web page is remotely hosted, user interface pages may also be generated from one or more locally stored files including content, markup, scripts, and/or style sheets. Upon the generation of a user interface page, an application platform can integrate the user interface page with the computing environment of the computing device and render the user interface page in the foreground of the computing environment of a computing device for user interaction. In certain embodiments, the logic of the background page can generate a user interface page in accordance with the requirements of a specific application, such as (but not limited to) ensuring that a rendered user interface page can fit within a window of the hosted application's user interface.

The logic of the hosted application can parse the text file of a remotely hosted web page to generate a user interface page with particular content, markup, scripts, or style sheets. The inclusion of particular content, markup, scripts or style sheets also covers the inclusion of API calls including (but not limited to) API calls to the application platform and remote servers. A user interface page that includes particular content, markup, scripts, and/or style sheets can be generated by modifying the accessed web page first as a retrieved text file and/or second after building the DOM of the modified retrieved text file. The first modification of the accessed web page as a retrieved text file includes parsing the code of the retrieved text file to determine the content of the retrieved text file to determine the content, markup, scripts, and/or style sheets to include or exclude from a user interface page. Further modifications can occur after a DOM is built. In several embodiments, text or nodes are modified by including or excluding particular content, markup, scripts, or style sheets as nodes of a completed DOM.

Figure 3:
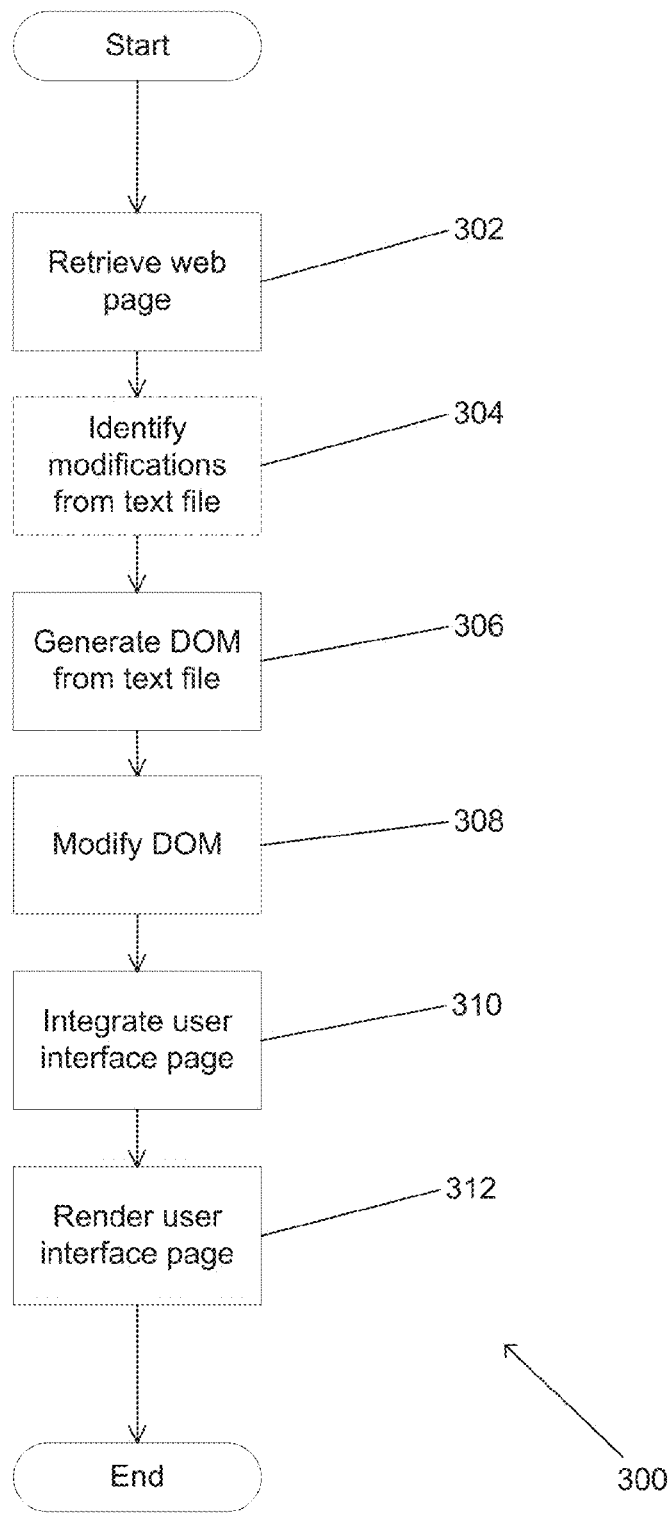
FIG. 3 is a flowchart of a process for rendering a user interface page in accordance with an embodiment of the invention.

A process for generating a user interface page in accordance with an embodiment of the invention is illustrated in FIG. 3. The process 300 includes retrieving (302) a web page. In many embodiments, a hosted application is provided (manually or automatically) with a URL from which one or more files associated with a web page can be retrieved (302). As noted above, the retrieved text files can include content with markup, scripts, and style sheets from which a typical web browser can render the web page. After retrieving (302) at least one text file, the process optionally includes determining modifications (304) that can be applied to inject and/or remove content, markup, scripts, and/or style sheets as a DOM is generated from the text file(s). The instructions that are provided to the application platform to modify the manner in which the DOM is generated by the application platform are provided by the background page of the hosted application and can be static or dynamically generated and/or retrieved from a remote source. A DOM representation of the text file(s) is then generated (306) by the application platform, which can interpret the instructions contained within the retrieved text file(s). Upon generating (306) the DOM, the DOM is modified (308) by injecting and/or removing content, markup, scripts and/or style sheets within the DOM. The instructions that are provided to the application platform to modify the DOM are provided by the background page of the hosted application and can be static or dynamically generated and/or retrieved from a remote source. The application platform utilizes its integration and rendering engine layers to integrate (310) and render (312) the user application page.

In certain embodiments, the application platform can either remove or replace the code of a remote web page as particular nodes of a remote web page in a DOM, according to the logic of the background page. In certain embodiments, a node including window functions (such as "window.open") can be detected and fed into the logic of the background page. Thereby, the logic of the background page can make a decision as to how the window functions that imply modifications outside of the rendered user interface page (e.g. resizeTo/ resizeBy) should influence the chrome that contains the rendered user interface page. The logic of the background page can replace the "window.open" code of opening a browser window by replacing it with a script for generating a user interface page using the details provided by the "window.open" code, such as (but not limited to) the URL of the web page to access while ignoring the other specifications such as a web browser window name, access to a menu bar, ability to resize the web browser window, and implementation of particular scrollbars, status bars and tool bars. Similarly, the logic can parse the text of a web page to determine if "window.resizeTo" or "window.resizeBy" or "window.close" code is present and remove or replace the code according to the logic of the background page.

In a variety of embodiments, the logic can incorporate custom style sheets (such as by adding style sheets when generating a user interface page's "head" node). In certain embodiments, incorporation of style sheets to a user interface page's "head" node is performed by the execution of the following code:

```
var style = document.createElement('STYLE');
style.type = 'text/css';
document.getElementsByTagName(
        'HEAD')[0].appendChild(style);
```

In numerous embodiments, the logic of the background page can incorporate functionality by integrating scripts or calls for application platform APIs (such as but not limited to an API that enables resizing of a user interface page, for example to a default window size of 640×480 pixels). In particular embodiments, scripts can be incorporated to a user interface page's "head" node where the incorporation of scripts to a user interface page's "head" node is performed by the execution of the following instructions:

```
var script = document.createElement('SCRIPT');
script.type = 'text/javascript';
document.getElementsByTagName(
        'HEAD')[0].appendChild(script);
```

In a number of embodiments, the logic of the background page controls user interaction with the hosted application by disabling or adding functions traditionally present in a web browser. In certain embodiments, disabling or adding functions is accomplished by adding or removing various scripts or API calls that enable functionalities including (but are not limited to) the ability to cut, copy, paste, select all text, utilize a spell checker, resize a rendered web page or the ability to manually determine the flow of web pages (such as enabling a user to view web pages previously accessed, e.g. back and/or forward commands) rendered by a web browser.

In many embodiments, the logic of the background page can generate a user interface page at any time after accessing the remote web page from which the user interface page is generated, including prior to or after the DOM of the web page is loaded.

In several embodiments, the logic of the background page can monitor the access of a web page (such as the download of one or more text files used to render a web page) during the generation of a user interface page and display a splash page while the user interface page is being generated. In certain embodiments, the download of one or more text files used to render a web page is reported back to the background page through the following function where the body of the function returns an indication of progress as an integer between 0 and 100:

```
function onPageLoadProgress(pageName, progress)
{ }
```

In particular embodiments, the detection of an error in the download of one or more text files used to render a web page causes the background page to load a user interface page based upon an error detected through the following function where the body of the function causes a particular user interface page to be displayed based upon a particular error:

```
function onPageLoadingError(url, pageName,
    errorCode) { }
```

Although specific processes for generating a user interface page are discussed above, user interface pages may be generated according to any of a variety of process as appropriate to the requirements of a specific application in accordance with embodiments of the invention. Rendering of user interface pages of a hosted application is discussed further below.

Rendering User Interface Pages

Figure 4:
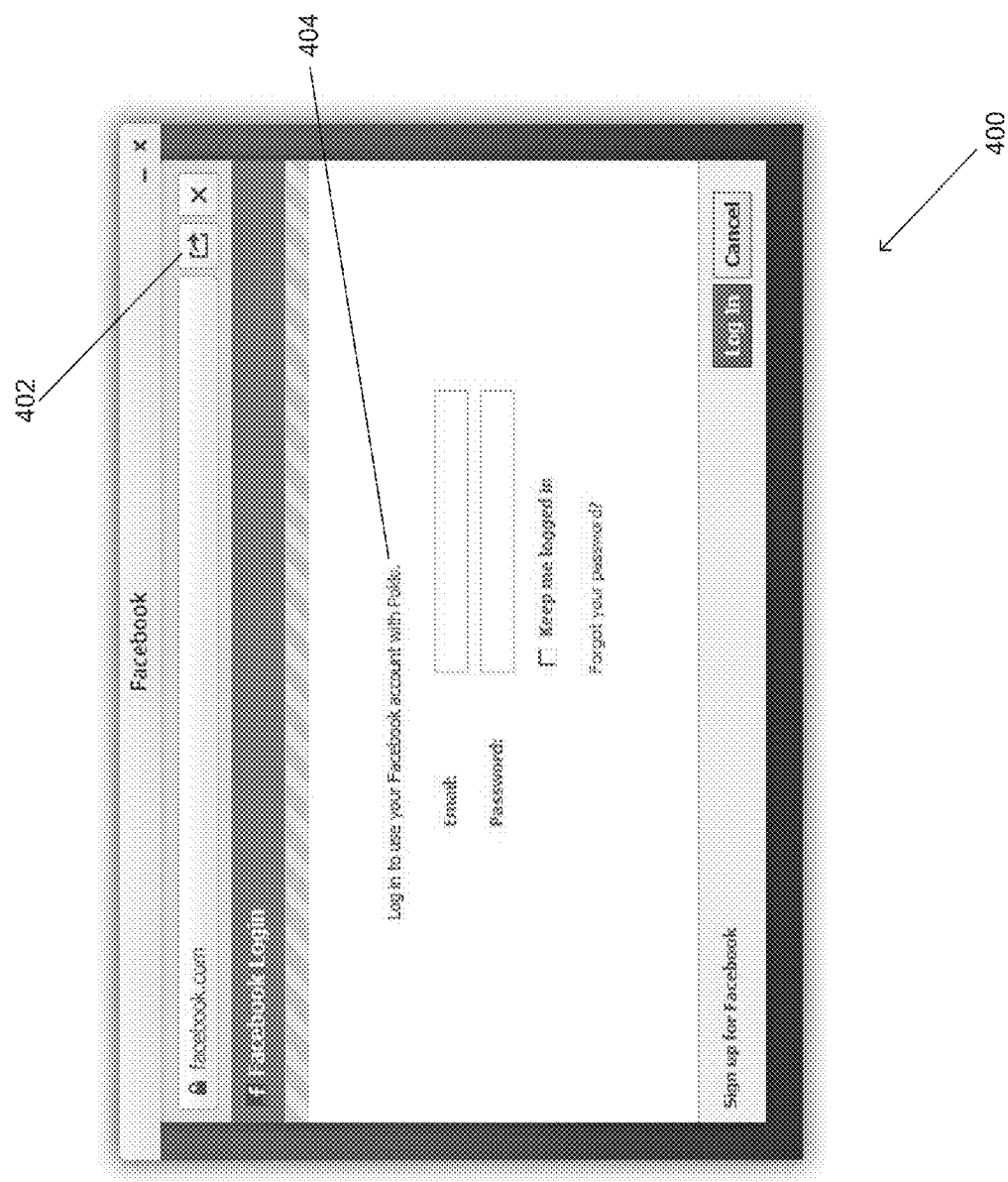
FIG. 4 is a screenshot of a user interface of a hosted application displaying a user interface page in accordance with an embodiment of the invention.

A user interface page of a hosted application in accordance with many embodiments of the invention can be rendered within the user interface of the computing device on which the hosted application is executing. A rendered user interface page in accordance with an embodiment of the invention is illustrated in FIG. 4. The user interface page 400 enables a user to log into a user account associated with the Facebook social networking service maintained by Facebook, Inc. headquartered in Menlo Park, Calif. Additional styling and functionality was injected into the user interface page (that was not present in the web page that the user interface page is derived from) such as a button 402 for launching the web page in a traditional web browser as well as a link 404 integrating additional functionality which was not present in the web page from which the user interface page is derived.

Although specific user interface pages of a hosted application are discussed above, any user interface page can be rendered as appropriate to a specific application in embodiments of the invention. Techniques for tracking and updated user hosted applications in accordance with embodiments of the invention are described in more detail below.

Creating and Tracking User Hosted Applications

Figure 5:
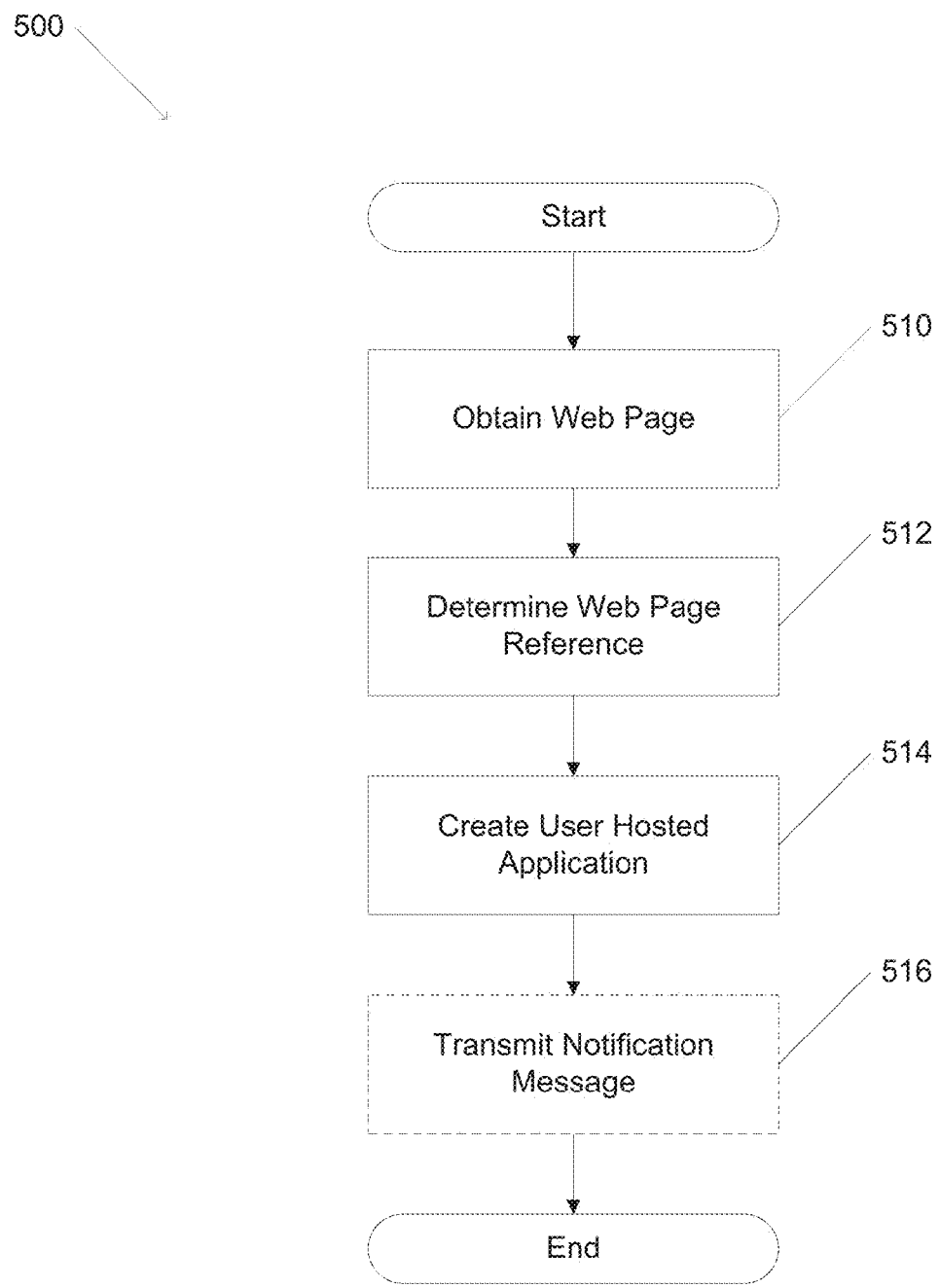
FIG. 5 is a flowchart of a process for tracking user hosted applications in accordance with an embodiment of the invention.

As described above, hosted applications instruct an application platform to generate a user interface page from a web page, allowing the user to interact with content derived from the web page with an experience similar to the web page executing as a natively hosted application. User hosted applications are hosted applications created by a user for a particular website and/or web page. Hosted application server systems in accordance with embodiments of the invention are configured to track the creation of user hosted applications. A process for creating and tracking the creation of user hosted applications is conceptually illustrated in FIG. 5. The process 500 includes obtaining (510) a web page and the web page reference is determined (512). A user hosted application is created (514). In a variety of embodiments, a notification message is transmitted (516).

Web pages are obtained (510) from a variety of sources, including content sources, as appropriate to the requirements of a specific application in accordance with embodiments of the invention. In several embodiments, the determined (512) web page reference is a URL identifying the location of the web page on the content server. However, a variety of other references to web pages, including identifying the URL of the website hosting the web page, can be utilized as appropriate to the requirements of a specific application in accordance with embodiments of the invention. User hosted applications can be created (514) using a computing device, a content server, and/or a hosted application server system as appropriate to the requirements of a specific application in accordance with embodiments of the invention. In several embodiments, a computing device can request that a hosted application server system (and/or a content server) create a user hosted application for a particular set of web pages by providing references to the web pages (e.g. a URL associated with the web page(s)) to the hosted application server system (and/or content server) via an API call. This (or another) API call can also allow for a user to control the availability of the created (514) user hosted application within an online marketplace provided by the hosted application server system as appropriate to the requirements of a specific application in accordance with embodiments of the invention. In a number of embodiments, the hosted application server system (and/or content server) assigns a unique identifier (such as a URL or other unique key; this identifier can be unique to the user hosted application and/or the user creating the user hosted application) to the created (514) user hosted application. In a variety of embodiments, user hosted applications are created (514) for the obtained (510) web page utilizing processes similar to those described above. In several embodiments, a user hosted application is created (514) by providing a reference to a web page to an application platform configured to generate user hosted application. In many embodiments, creating (514) a user hosted application includes harvesting login credentials provided for the web pages and/or website. These login credentials can be utilized by the application platform executing the user hosted application to seamlessly present the web pages to the user without the need to provide the login credentials every time the user hosted application is launched. In a number of embodiments, the created (514) user hosted application is associated with a version number based on the web page, date, and/or other metadata related to the user hosted application. The user hosted application can be created using a variety of devices, such as by using a hosted application server system and/or a computing device as appropriate to the requirements of a specific application in accordance with embodiments of the invention.

The transmitted (516) notification message includes metadata identifying the obtained (510) web page(s) referenced in the created (514) user hosted application. The web pages can be identified via the URL for the web page, a unique identifier (such as a computed hash) corresponding to the web page, and/or a version number associated with the web page at the time the user hosted application is created (514). In many embodiments, the notification message also includes an identifier of a computing device that is creating (514) the user hosted application. The notification message can also include additional metadata, such as a user identifier for a user account of a hosted application server system and/or the content server, as appropriate to the requirements of a specific application in accordance with embodiments of the invention. In several embodiments, the user hosted application is created using the hosted application server system and the information contained within the notification message can be recorded directly by the hosted application server system without the transmission (516) of a notification message.

Specific processes for creating and tracking user hosted applications using computing devices in accordance with embodiments of the invention are described above; however, a variety of processes, including those that transmit notification messages using content servers, can be utilized as appropriate to the requirements of a specific application in accordance with embodiments of the invention. Processes for updating user hosted applications in accordance with embodiments of the invention are described below.

Updating User Hosted Applications

Figure 6:
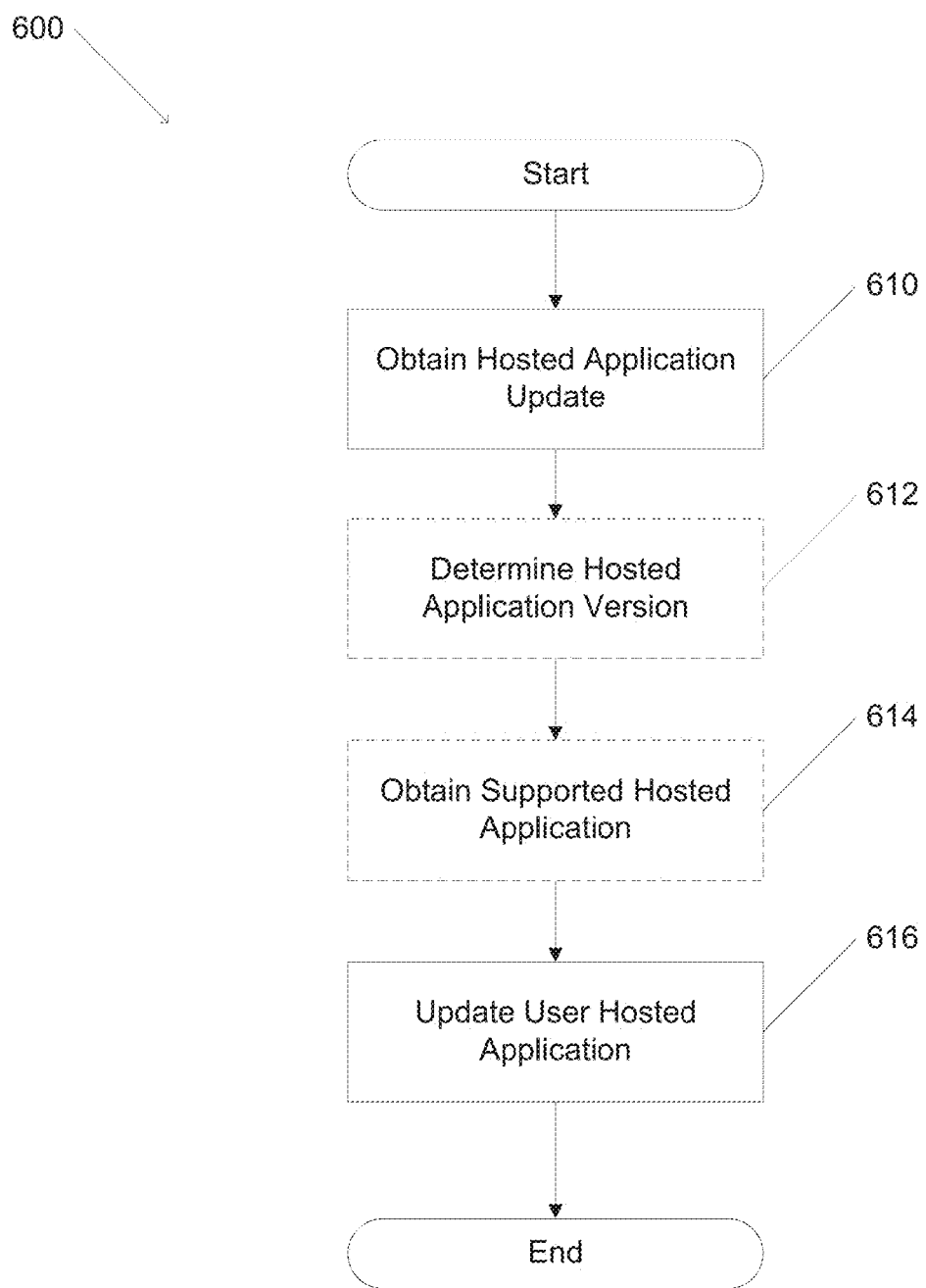
FIG. 6 is a flowchart of a process for updating user hosted applications in accordance with an embodiment of the invention.

Changes to the website and/or web pages referenced by a user hosted application can result in changes to the logic contained in the background pages of user hosted applications referencing the web pages. However, the user hosted application may not be able to be modified to incorporate the changes and/or the changes may be targeted toward a supported hosted application for the website and/or web pages. Computing devices in accordance with embodiments of the invention are configured to obtain supported hosted applications and/or hosted application updates corresponding to user hosted applications contained on the computing device. A process for updating user hosted applications is conceptually illustrated in FIG. 6. The process 600 includes obtaining (610) a hosted application update. In a number of embodiments, a hosted application version is determined (612) and/or a supported hosted application is obtained (614). The user hosted application is updated (616).

In a number of embodiments, a hosted application update is obtained (610) from a content source and/or a hosted application developer (or content developer) creating (or maintaining) the web pages provided by the content source. In many embodiments, the hosted application update is obtained (610) from the user of a user hosted application. The hosted application update is configured to be applied to one or more versions of a hosted application. In several embodiments, the hosted application update (610) identifies one or more versions of a hosted application to which the hosted application update can be applied. In many embodiments, the determined (612) hosted application version is a version number, URL, and/or other unique identifier associated with a user hosted application and/or a supported hosted application. In the event that the obtained (610) hosted application update is not compatible (e.g. cannot be applied) to a user hosted application, a supported hosted application corresponding to the user hosted application can be obtained (614) as appropriate to the requirements of a specific application in accordance with embodiments of the invention. The supported hosted application can be obtained (614) from a content source and/or from a hosted application server system. The user hosted application can be updated (616) by applying the obtained (610) hosted application update to the user hosted application. Applying an update to a user hosted application can be performed using a variety of techniques as appropriate to the requirements of a specific application in accordance with embodiments of the invention, such as by modifying the background page (or any other file) associated with the user hosted application. In many embodiments, the updated (616) user hosted application has a version number corresponding to the obtained (610) hosted application update. When a supported hosted application has been obtained (614), updating (616) the user hosted application can include replacing some or all of the user hosted application with the obtained (614) supported hosted application. In several embodiments, the obtained (610) hosted application update is used to update (616) the supported hosted application after it has been used to replace and/or modify the user hosted application.

Although specific processes for updating user hosted applications using computing devices in accordance with embodiments of the invention are described above, a variety of processes can be utilized as appropriate to the requirements of a specific application in accordance with embodiments of the invention. Processes for distributing supported hosted applications in accordance with embodiments of the invention are described below.

Distributing Supported Hosted Applications

Figure 7:
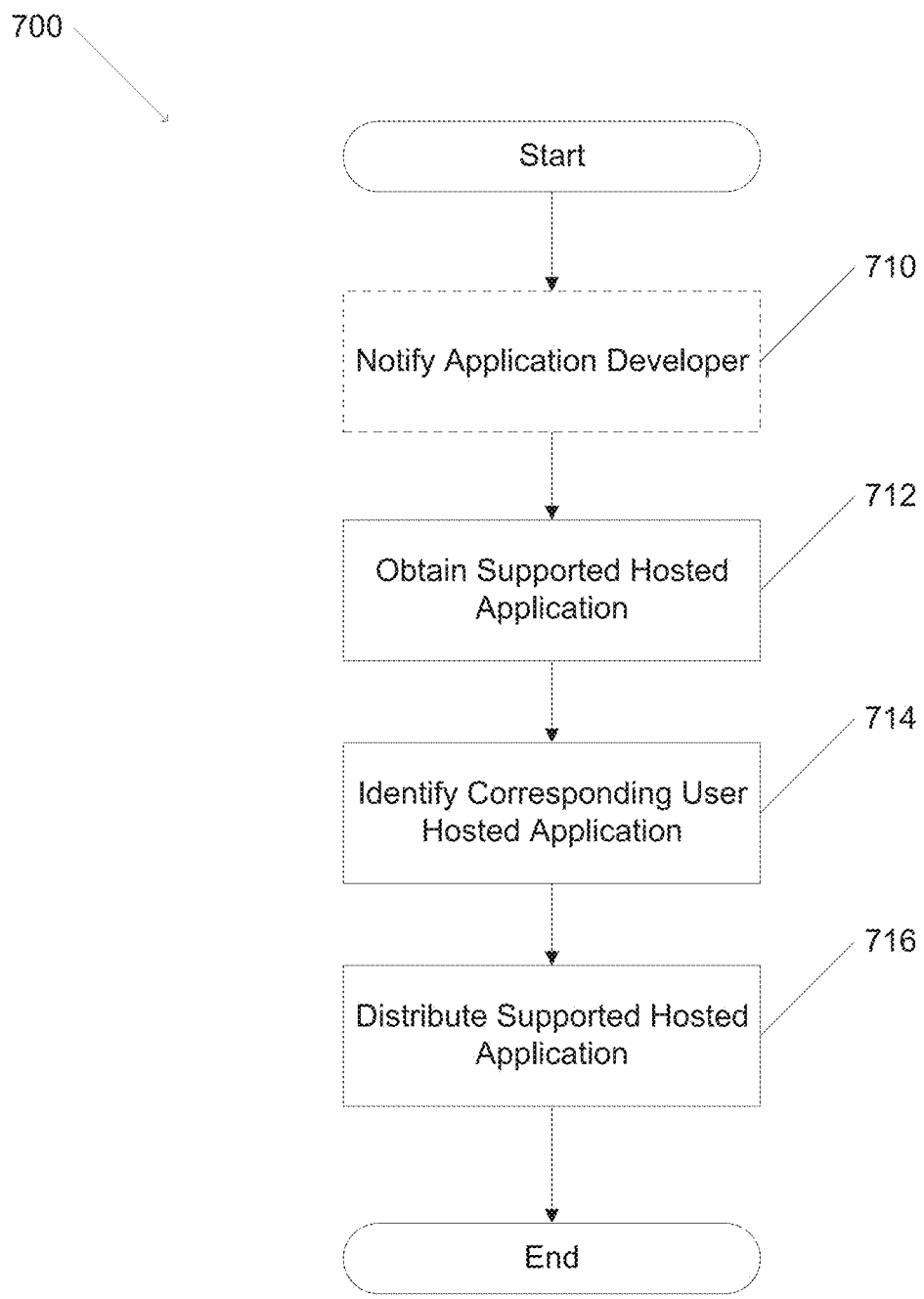
FIG. 7 is a flowchart of a process for distributing supported hosted applications in accordance with an embodiment of the invention.

As user hosted applications are created for web pages, the developers of the web pages can identify an opportunity to develop a supported hosted application providing a user interface for their web pages. Once a supported hosted application is created for a particular set of web pages, users of the user hosted applications can migrate to the supported hosted application. Hosted application server systems are configured to identify when user hosted applications are being created for a set of web pages and facilitate the distribution of the supported hosted application to the users of the user hosted applications. A process for distributing supported hosted applications in accordance with an embodiment of the invention is conceptually illustrated in FIG. 7. In a variety of embodiments, the process 700 includes notifying (710) a hosted application developer regarding user hosted applications. A supported hosted application is obtained (712). Corresponding user hosted applications are identified (714) and supported hosted applications are distributed (716).

In many embodiments, a hosted application developer is notified (710) when the hosted application server system has received one or more notification messages indicating that a web page (or website) associated with the hosted application developer has had a user hosted application created for the web page. The hosted application developer can be notified (710) every time a user hosted application is created, periodically, and/or once a threshold number of user hosted applications have been created for the web page as appropriate to the requirements of a specific application in accordance with embodiments of the invention. The hosted application developers can be notified by application developer messages via any of variety of communication techniques (such as e-mail) as appropriate to the requirements of a specific application in accordance with embodiments of the invention.

Supported hosted applications can be obtained (712) from a variety of sources, including hosted application developers and/or content sources as appropriate to the requirements of a specific application in accordance with embodiments of the invention. In a variety of embodiments, identifying (714) corresponding user hosted applications involves identifying user hosted applications (based on the notification messages) that are associated with the same web pages and/or websites as the obtained (712) supported hosted application. Other factors, such as a unique identifier assigned to the supported hosted application and/or user hosted application, can be utilized to identify (714) corresponding user hosted applications as appropriate to the requirements of a specific application in accordance with embodiments of the invention. In several embodiments, the identified (714) corresponding user hosted applications are associated with computing devices that differ from the computing device that the supported hosted application is associated with; e.g. a user hosted application may be associated with a mobile telephone while the supported hosted application is associated with a personal computer. In a variety of embodiments, the logic contained in the background page of the supported hosted application includes layout logic that formats the web pages referenced in the supported hosted application across a variety of computing devices.

In a number of embodiments, the obtained (712) supported hosted application is distributed (716) to the computing devices and/or user accounts that are associated with the identified (714) user hosted applications. The supported hosted application can be distributed (716) directly (such as by pushing the supported hosted application to the computing devices) and/or via a notification alerting the computing device that a supported hosted application corresponding to the user hosted application is available. The distributed (716) supported hosted application (and/or the notification of the supported hosted application) can be presented by computing device by rendering a badge and/or a pop-up notification within the computing environment of the computing device indicating the presence of the supported hosted application using an application platform present on the computing device. The notification can allow the computing device to obtain the supported hosted application directly and/or be directed to an online marketplace hosted on a hosted application server system where the supported hosted application may be obtained. In many embodiments, the user hosted application is backed up (or otherwise stored) on the computing device and/or the hosted application server when a supported hosted application and/or a hosted application update is distributed (716) to replace and/or update the user hosted application. In this way, a user can restore the identified (714) user hosted application.

Specific processes for distributing supported hosted applications using hosted application server systems in accordance with embodiments of the invention are described above; however, a variety of processes, including those that distribute supported hosted applications using content (or any other) servers, can be utilized as appropriate to the requirements of a specific application in accordance with embodiments of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device configured to create a user hosted application, comprising:
   a processor and storage, where an operating system is installed on the computing device that configures the processor to create a computing environment;
   an application platform application stored in the storage of the computing device, where the application platform application comprises:
     a rendering engine process configured to:
       render pages within the computing environment created by the operating system by interpreting instructions written in a rendering language; and
       implement a virtual machine configured to execute instructions written in a scripting language; and
     an integration process that enables instructions executing within the virtual machine to modify the computing environment; and
   at least one hosted application comprising a background page file including instructions in the scripting language;
   wherein the virtual machine is configured to parse the instructions in the scripting language contained within the background page file to configure the processor to:
     download at least one remotely hosted file containing instructions in the rendering language for rendering a web page;
     modify the instructions written in the scripting language within the at least one downloaded file in accordance with a predetermined page modification rule to create at least one modified file; and
     build a document object model (DOM) based on at least the instructions in the at least one modified file;
   wherein the rendering engine process is configured to render a user interface page based on the DOM generated by the execution of the background page;
   wherein the application platform application configures the processor to obtain at least one user hosted application, where a user hosted application comprises a background page and at least one reference to a web page; and
   wherein the application platform application configures the processor to transmit a notification message based on obtaining the at least one user hosted application.

2. The computing device of claim 1, wherein the notification message comprises the at least one reference to the web page.

3. The computing device of claim 1, wherein the notification message comprises unique identifier data, where the unique identifier data is generated based at least a portion of the user hosted application.

4. The computing device of claim 1, wherein the application platform application configures the processor to:
   obtain a hosted application update; and
   apply the hosted application update to at least one of the at least one user hosted applications.

5. The computing device of claim 4, wherein:
   at least one user hosted application in the at least one hosted application further comprises version metadata identifying the version of the hosted application; and
   applying the hosted application update to the user hosted application comprises modifying the version metadata associated with the user hosted application, where the modified version metadata indicates that the hosted application update has been applied to the user hosted application.

6. The computing device of claim 5, wherein:
   the hosted application update further comprises hosted application update version metadata identifying at least one version of the user hosted application to which the hosted application update applies; and
   the application platform application configures the processor to apply the hosted application update to the user hosted application when the version metadata is identified in the hosted application update version metadata.

7. The computing device of claim 4, wherein:
   at least one user hosted application in the at least one hosted application further comprises version metadata identifying the version of the user hosted application; and
   applying the hosted application update to a hosted application comprises obtaining a supported hosted application corresponding to the user hosted application based on the version metadata.

8. The computing device of claim 4, wherein the application platform application further configures the processor to apply the hosted application update to the user hosted application by obtaining a supported hosted application based on the user hosted application.

9. The computing device of claim 8, wherein the hosted application update is applied to the obtained supported hosted application.

10. The computing device of claim 8, wherein the application platform application further configures the processor to display a notification indicating that a supported hosted application corresponding to the user hosted application is available.

11. A method for creating user hosted applications, comprising:
obtaining at least one user hosted application using a computing device, where a user hosted application comprises a background page comprising instructions in a scripting language and at least one reference to a web page and the user hosted application is configured to be executed by an application platform application on the computing device, where the application platform application comprises:
a rendering engine process configured to:
render pages within the computing environment created by an operating system on the computing device by interpreting instructions written in a rendering language; and
implement a virtual machine configured to:
execute instructions written in the scripting language; and
parse the instructions in the scripting language contained within the background page file to:
download at least one remotely hosted file containing instructions in the rendering language for rendering a web page;
modify the instructions written in the scripting language within the at least one downloaded file in accordance with a predetermined page modification rule to create at least one modified file; and
build a document object model (DOM) based on at least the instructions in the at least one modified file; and
transmitting a notification message based on obtaining the at least one user hosted application using the computing device.

12. A hosted application server system, comprising:
a processor; and
storage connected to the processor and configured to store an application hosting application;
wherein the application hosting application configures the processor to:
obtain a set of supported hosted applications, where a supported hosted application comprises a background page comprising instructions in a scripting language and a hosted application is configured to be executed by an application platform application on a computing device separate from the hosted application server system, where the application platform application comprises:
a rendering engine process configured to:
render pages within the computing environment created by an operating system on the computing device by interpreting instructions written in a rendering language; and
implement a virtual machine configured to:
execute instructions written in the scripting language; and
parse the instructions in the scripting language contained within the background page file to:
download at least one remotely hosted file containing instructions in the rendering language for rendering a web page;
modify the instructions written in the scripting language within the at least one downloaded file in accordance with a predetermined page modification rule to create at least one modified file; and
build a document object model (DOM) based on at least the instructions in the at least one modified file; and
obtain a set of notification messages, where a notification message in the set of notification messages comprises a notification message sender identifying the source of the notification message and the notification message comprises a description of a user hosted application, where the description comprises at least one reference to a web page referenced by the user hosted application;
wherein the user hosted application comprises a background page file including instructions in the scripting language.

13. The hosted application server system of claim 12, wherein the application hosting application further configures the processor to identify at least one supported hosted application in the set of supported applications corresponding to a user hosted application identified in at least one notification message in the set of notification messages.

14. The hosted application server system of claim 13, wherein the supported hosted application is identified using the at least one web page referenced in the user hosted application.

15. The hosted application server system of claim 13, wherein the supported hosted application is identified using unique identifier data based at least a portion of the user hosted application.

16. The hosted application server system of claim 13, wherein:
the application hosting application further configures the processor to transmit a supported application message to the source of the notification message when a supported hosted application is identified based on the user hosted application; and
the supported application message describes the supported hosted application corresponding to the user hosted application.

17. The hosted application server system of claim 12, wherein:
the application hosting application further configures the processor to obtain a hosted application update; and
the hosted application update corresponds to at least one supported hosted application in the set of supported hosted applications.

18. The hosted application server system of claim 17, wherein:
the application hosting application further configures the processor to transmit the hosted application update to at least one notification message sender identified by a notification message in the set of notification messages; and
the user hosted application identified in the notification message corresponds to the supported hosted application corresponding to the hosted application update.

19. The hosted application server system of claim 17, wherein:
the application hosting application further configures the processor to transmit the supported hosted application corresponding to the hosted application update to at least one notification message sender identified by a notification message in the set of notification messages; and the user hosted application identified in the notification message corresponds to the supported hosted application corresponding to the hosted application update.

20. The hosted application server system of claim 12, wherein the application hosting application further configures the processor to:
 identify at least one user hosted application described in the set of notifications without a corresponding supported hosted application; and
 transmit an application developer notification based on the identified user hosted applications, where the application developer notification describes the web pages referenced by the user hosted applications.

* * * * *